United States Patent
Lesage (10) Patent No.: US 9,613,089 B2
(45) Date of Patent: Apr. 4, 2017

(54) FORM TEMPLATE REFACTORING

(75) Inventor: Daniel Lesage, Ontario (CA)

(73) Assignee: Adobe Systems Incorporated, San Jose, CA (US)

( * ) Notice: Subject to any disclaimer, the term of this patent is extended or adjusted under 35 U.S.C. 154(b) by 1147 days.

(21) Appl. No.: 11/849,800

(22) Filed: Sep. 4, 2007

(65) Prior Publication Data

US 2014/0032480 A1    Jan. 30, 2014

(51) Int. Cl.
  *G06F 17/30* (2006.01)
  *G06F 17/22* (2006.01)
  *G06F 17/24* (2006.01)

(52) U.S. Cl.
  CPC .... *G06F 17/30398* (2013.01); *G06F 17/2247* (2013.01); *G06F 17/243* (2013.01); *G06F 17/248* (2013.01)

(58) Field of Classification Search
  CPC .................................................. G06F 17/2247
  USPC ........................... 707/739, 999.001, 739.999
  See application file for complete search history.

(56) References Cited

U.S. PATENT DOCUMENTS

| | | | |
|---|---|---|---|
| 5,900,870 A * | 5/1999 | Malone et al. | 715/866 |
| 6,959,414 B1 * | 10/2005 | Kakehashi | 715/236 |
| 7,168,035 B1 * | 1/2007 | Bell et al. | 715/234 |
| 7,281,018 B1 * | 10/2007 | Begun et al. | 707/102 |
| 7,739,310 B1 * | 6/2010 | Shmulevich et al. | 707/802 |
| 2003/0221162 A1 * | 11/2003 | Sridhar | 715/501.1 |
| 2004/0073404 A1 * | 4/2004 | Brooks et al. | 702/183 |
| 2004/0268229 A1 * | 12/2004 | Paoli et al. | 715/508 |
| 2005/0108648 A1 * | 5/2005 | Olander et al. | 715/744 |
| 2005/0183006 A1 * | 8/2005 | Rivers-Moore et al. | 715/513 |
| 2006/0200337 A1 * | 9/2006 | Cipollone et al. | 704/4 |
| 2007/0088554 A1 * | 4/2007 | Harb et al. | 704/257 |
| 2007/0220419 A1 * | 9/2007 | Stibel et al. | 715/511 |
| 2008/0140230 A1 * | 6/2008 | Bromley | 700/83 |

* cited by examiner

*Primary Examiner* — Etienne Leroux
*Assistant Examiner* — Sheryl Holland
(74) *Attorney, Agent, or Firm* — Shook, Hardy & Bacon, L.L.P.

(57) ABSTRACT

In some embodiments, a method includes receiving a command to update a form component within a set of one or more form templates. The method also includes receiving an alternative form component for the form component that is to be updated. The method includes performing a pattern matching across a number of form templates to identify the set of one or more form templates in the number of form templates. The method includes refactoring the set of one or more form templates. The refactoring includes changing a reference in the set of one or more form templates to reference the alternative form component.

21 Claims, 9 Drawing Sheets

| 302 306 | 304 308 |
|---|---|
| ORDERED BY | DELIVER TO |
| COMPANY ________ | COMPANY NAME ________ |
| ADDRESS ________ | ADDRESS ________ |
| CITY ________ | CITY ________ |
| COUNTRY ________ ▼ | COUNTRY ________ |
| STATE/PROVINCE ________ ▼ | STATE/PROVINCE ________ ▼ |
| ZIP/POSTAL CODE ________ | ZIP/POSTAL CODE ________ |
| PHONE NO. ________ | PHONE NO. ________ |
| FAX NO. ________ | FAX NO. ________ |
| CONTACT NAME ________ | CONTACT NAME ________ |
| 310 | 312 |

| ORDERED BY | DELIVER TO |
|---|---|
| COMPANY _________ | COMPANY _________ |
| ADDRESS _________ | ADDRESS _________ |
| CITY _________ | CITY _________ |
| COUNTRY ________ ▼ | COUNTRY ________ ▼ |
| STATE/PROVIDENCE ____ ▼ | STATE/PROVIDENCE ____ ▼ |
| ZIP/POSTAL CODE _____ | ZIP/POSTAL CODE _____ |
| PHONE NO. _________ | PHONE NO. _________ |
| FAX NO. _________ | FAX NO. _________ |
| CONTACT NAME _____ | CONTACT NAME _____ |

FORM TEMPLATE REFACTORING

COPYRIGHT

A portion of the disclosure of this document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software, data, and/or screenshots which may be described below and in the drawings that form a part of this document: Copyright© 2006, Adobe Systems Incorporated. All Rights Reserved.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

In many fields of endeavor, it is necessary for electronic forms, sometimes embedded within other electronic content, such as web pages or electronic document, to be presented to a user. These electronic forms are typically presented as a graphical user interface (GUI) and users may use one or more user input devices to fill in the forms.

Electronic forms may include a number of different types of fields, depending on the nature of the information to be gathered from a user. Typical examples include single-line text fields (in which a user positions a cursor or other indication within a rendering of a rectangular region and types a single line of text, which appears in the rendering and may be subsequently transmitted or stored in association with an identifier of the text field), multi-line text entry boxes for entering larger texts, various binary inputs (such as check boxes adjacent to various semantically relevant labels), and selectable lists of items. Such lists may comprise a rectangular box capable of showing a single list entry. By clicking on a button typically located in conjunction with the box, a larger box is rendered showing a number of selectable items. This larger box sometimes appears below the original box and thus such selectable lists have come to be known as "drop-down lists." Once the user has selected an item (e.g. which may include but is not limited to clicking on its text with a mouse or other device), the larger box disappears and the selected item is shown in the rectangular box. Some other lists (sometimes called scrolling lists) may be in the form of a rectangular field capable of showing several list entries at once, possibly with a scroll bar or other affordance to permit a user to view various list items where the number of list items is larger than the number than can be accommodated within the rectangle rendered on a display device.

Electronic forms may be described in files that include data that may be termed a form template. Such a form template may include information about describing the electronic form, including information about the various form elements to be displayed, their labels, their sizes, and the spatial relationship of the elements to be displayed. Such form templates may also include data used to pre-populate the rendering of the form (for example, the list of items to be displayed in a list) or executable instructions (sometimes called "scripts") for retrieving items (e.g. short text strings) from a data store, in which the retrieved items are included in the rendering of a form element. For example, a form template may specify that a scrolling list is to be rendered, and may include a list of text labels to be shown as the GUI selectable items within the list rendering.

BRIEF DESCRIPTION OF THE DRAWINGS

The embodiments are provided by way of example and not limitation in the figures of the accompanying drawings, in which like references indicate similar elements and in which.

DETAILED DESCRIPTION

Methods, apparatus and systems for refactoring of form templates are described. In the following description, numerous specific details are set forth. However, it is understood that embodiments of the invention may be practiced without these specific details. In other instances, structures and techniques have not been shown in detail in order not to obscure the understanding of this description.

As used herein, the term "form template" refers to any file, data structure, or other electronic artifact specifying a collection of descriptions of user interface affordances that may be presented in conjunction with one another so as to elicit user input. In some embodiments, the entry of data via a graphical user interface with respect to a rendering of a particular form element may be used to associate a token representing that form element with the data entered via the graphical user interface, with the data and token being associated for further processing, storage, or transmission.

As used herein, the term "subform template" refers to a part of a form template that represents a logical grouping of form elements (such as fields, text, graphics, etc.). In some embodiments, a subform template resides within its enclosing form template. Subform templates may include templates for lists (such as scrolling, drop-down, etc.), buttons, boxes (such as text, check, etc.), etc.

As used herein, the term "form fragment template" refers to a part of a form template that represents a logical grouping of form elements (such as fields, text, graphics, etc.). In some embodiments, a form fragment template resides external from a form template. The form template may reference the form fragment template. Form fragment templates may include templates for lists (such as scrolling, drop-down, etc.), buttons, boxes (such as text, check, etc.), etc.

As used herein, the term "code fragment template" refers to a part of a form template that includes code (such as script). In some embodiments, a code fragment template resides external from a form template. The form template may reference the code fragment template. The code may be executed as part of the form being rendered.

As used herein, the term "refactoring" refers generally to updating a current set of data. The refactoring may include changing the structure of the data. The refactoring may include identification, extraction and manipulation of form templates or form components thereof to reduce maintenance or increase readability/searchability of the templates or form components.

As used herein, the term "rendering" used as a verb refers to presenting or making accessible electronic content or content elements to be perceived, viewed, or otherwise experienced by a user, or be made available for further processing, such as, for example, searching, digesting, printing, analyzing, distilling, or transforming by computational processes that may not include processing the intrinsic data structure describing the electronic content or content element. Whether a content element associated with an electronic content is included in the rendering of the electronic content may, by default, be determined by whether or not the content element is active.

As used herein, the term "rendering" used as a noun refers human-perceivable representations of data that is within a machine and perception-specialized organizations of data defining such representations. For example, a rendering may include a pattern of human-perceivable matter or energy presented on an output device by a machine, as well as the organization of data within a machine specialized to define such patterns. For example, such organizations of data may include the electronic configuration of a memory used by a graphics display processor, or a file containing an audio segment suitable for playing via an audio system of a computer.

Within an electronic form, various form elements may be arranged with respect to one another and/or may be visually grouped according to descriptions in the form template. Various business entities (e.g., insurance provider), individuals, etc. may have numerous electronic forms (such as electronic forms based on ADOBE® ACROBAT® Portable Document Format (PDF)) that are based on form templates. Many of these form templates may contain form components (such as subform templates) that represent identical data (such as an address block). As further described below, example embodiments ease maintenance of these form templates. In particular, example embodiments enable business entities, individuals, etc. to identify, extract and update the common subform templates across any number of form templates.

In some embodiments, a form template may include one or more form components (e.g., subform templates, form fragment templates, code fragment templates, fields, etc.). A number of different form templates may share a same form component. In some embodiments, each of the different form templates may have its own copy of the form component. In some embodiments, each of the different form templates may reference one copy of the form component. For example, multiple form templates may have a same subform template for an address field that includes street address, city, state, country, zip code, etc. As further described below, example embodiments enable updates across sets of form components of form templates to enable refactoring of such templates. Example embodiments allow for updates to these form components that are propagated across one or more form templates. Accordingly, in example embodiments, updates to a single form component can be propagated across a large set of form templates. One example of an update to a form component may include an update to a location in a template hierarchy for the form component. To illustrate, two subform templates may be merged into one subform template; a subform template may be split into two subform templates; a number of separate fields may be combined into a subform template, etc. Another example of updates to a form component may be a change in type for the form component. For example, a subform template may be converted into a form fragment template. Another example of updates to a form component may include a change in the name or identification of the form component.

Figure 1:
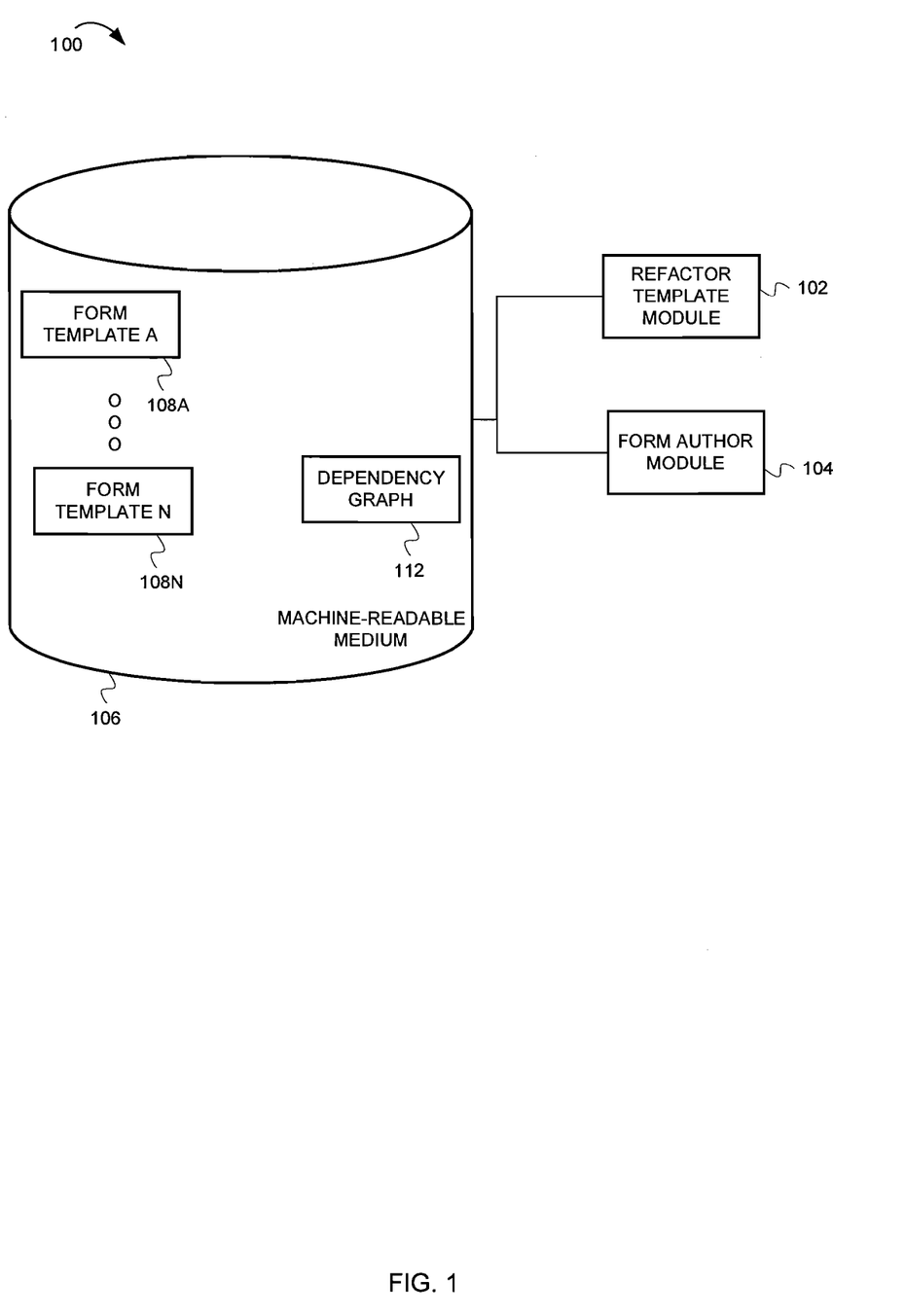
FIG. 1 is a system for refactoring of form templates, according to example embodiments.

FIG. 1 is a system for refactoring of form templates, according to example embodiments. A system 100 includes a refactor template module 102, a form author module 104 and a machine-readable medium 106. The refactor template module 102 and the form author module 104 may be software, hardware, firmware or a combination thereof for executing operations, according to some embodiments. In some embodiments, the refactor template module 102 may be part of the form author module 104. The machine-readable medium 106 may be representative of any type of data store. The machine-readable medium 106 may be any type of volatile and nonvolatile machine-readable medium (such as random access memory (RAM), magnetic disk storage media, optical storage media, flash memory devices, etc.). The machine-readable medium 106 stores a number of form templates 108A-108N and, optionally, a dependency graph 112. A more detailed description of the form templates 108 and the operations thereon by the refactor template module 102 is now set forth.

Figure 2:
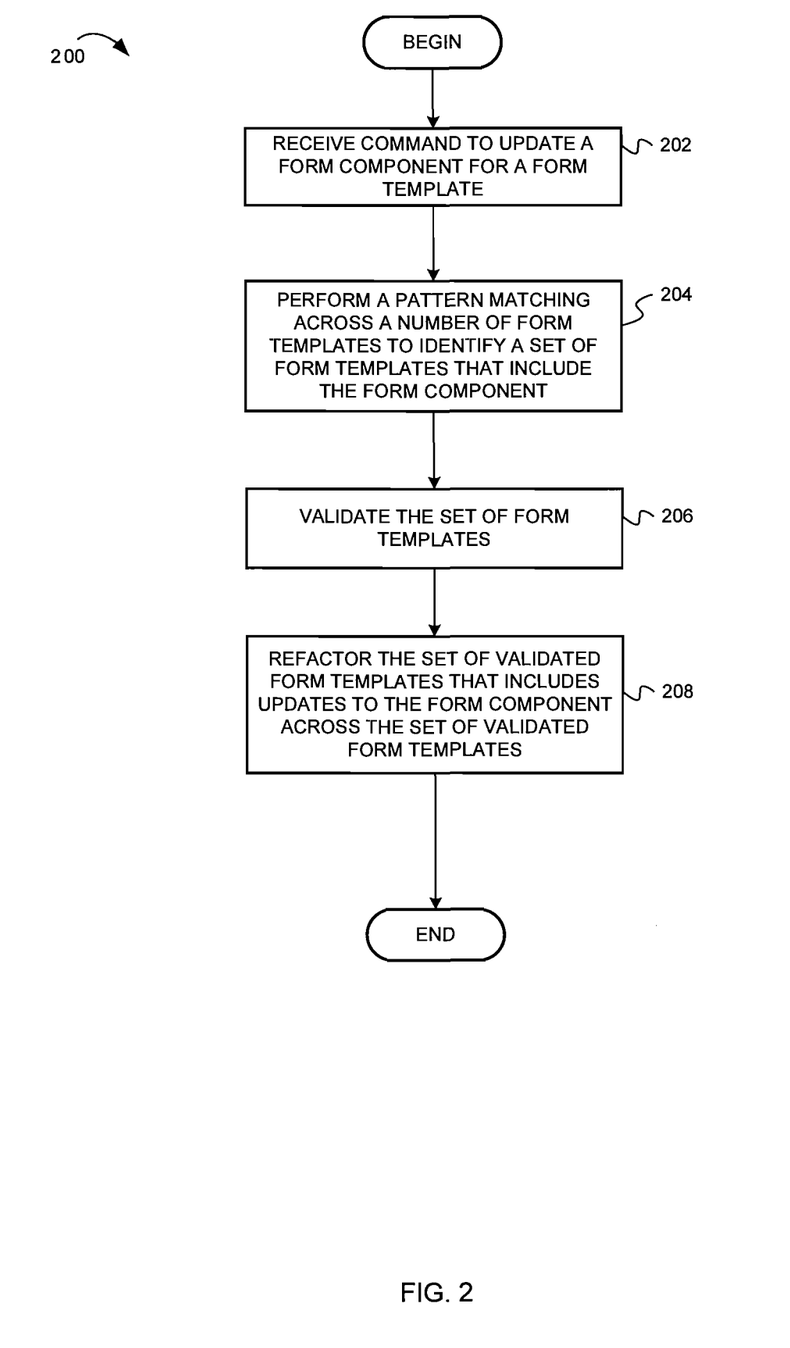
FIG. 2 is a diagram of a method for refactoring of form templates, according to example embodiments.

In particular, operations, according to example embodiments, are now described. In certain embodiments, the operations are performed by instructions residing on machine-readable media (e.g., software), while in other embodiments, the methods are performed by hardware or other logic (e.g., digital logic). FIG. 2 is a diagram of a method for refactoring of form templates, according to example embodiments. The flow diagram 200 is described with reference to FIG. 1. In some embodiments, the flow diagram 200 is performed by the refactor template module 102. The flow diagram 200 commences at block 202.

At block 202, the refactor template module 102 receives a command to update a form component for a form template. For example, the refactor template module 102 may receive the command (via a user interface device) from a programmer who is updating a form component for a form template. As described above, the form component being updated may be a subform template, a form fragment template, a code fragment template, a field, etc.

Figure 3:
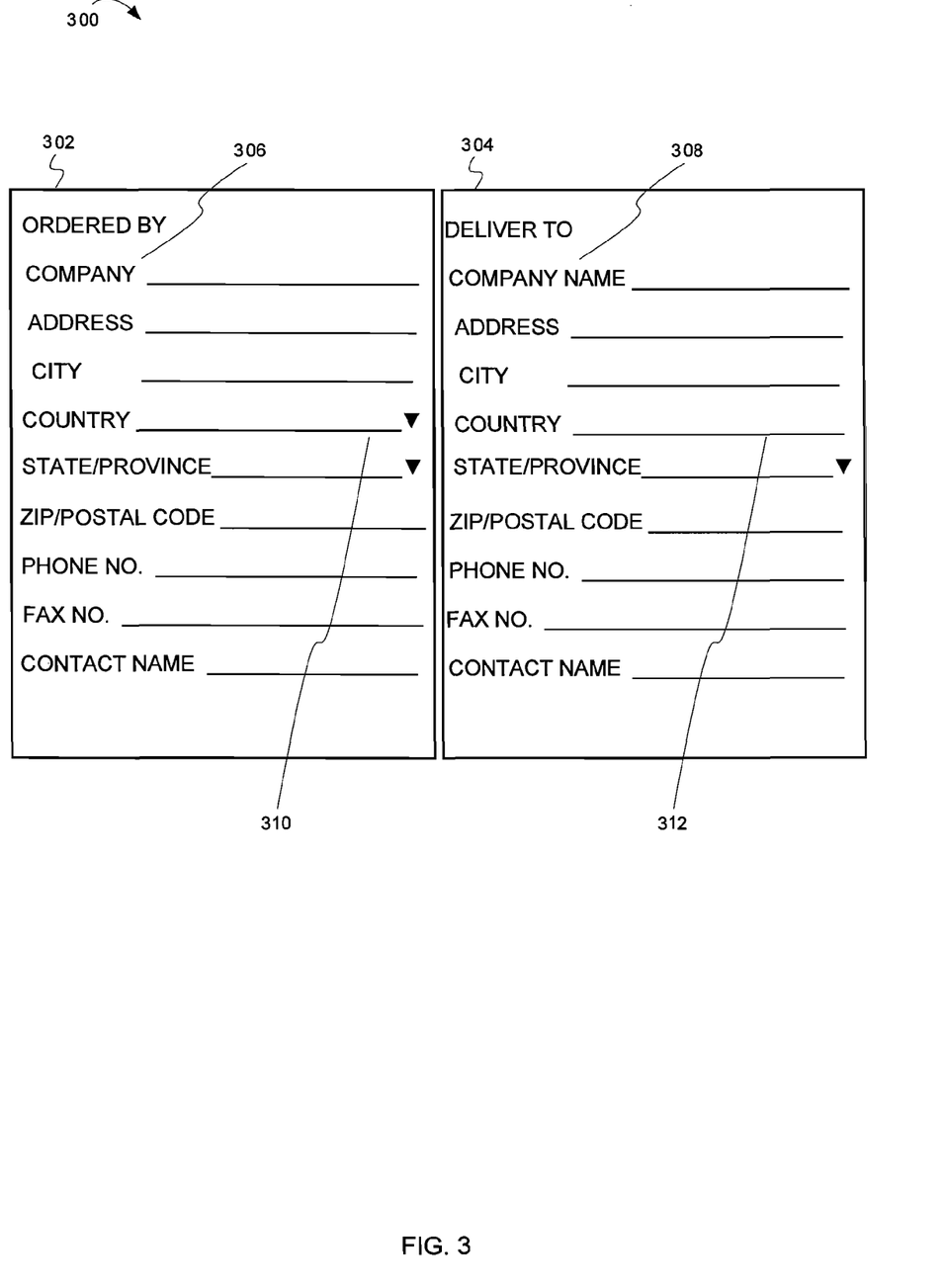
FIG. 3 illustrates form components for a purchase order template prior to refactor update, according to example embodiments.

For example, FIG. 3 illustrates form components for a purchase order template prior to refactor update, according to example embodiments. FIG. 3 illustrates form components 300 that are two form fragment templates that are part of a form template for a purchase order. The two form fragment templates include two different address blocks. A first address block 302 is for the address of the company that ordered the item. A second address block 304 is for the address of the company to which the item is being shipped. While there are many similarities, the first address block 302 and the second address block 304 have two differences. In the first address block 302, a company field 306 has a caption of "Company." In contrast, in the second address block 304, a company field 308 has a caption of "Company Name." A second difference relates to the country fields. In the first address block 302, a country field 310 is a pulldown menu. In the second address bock 304, a country field 312 is a text input field.

Figure 4:
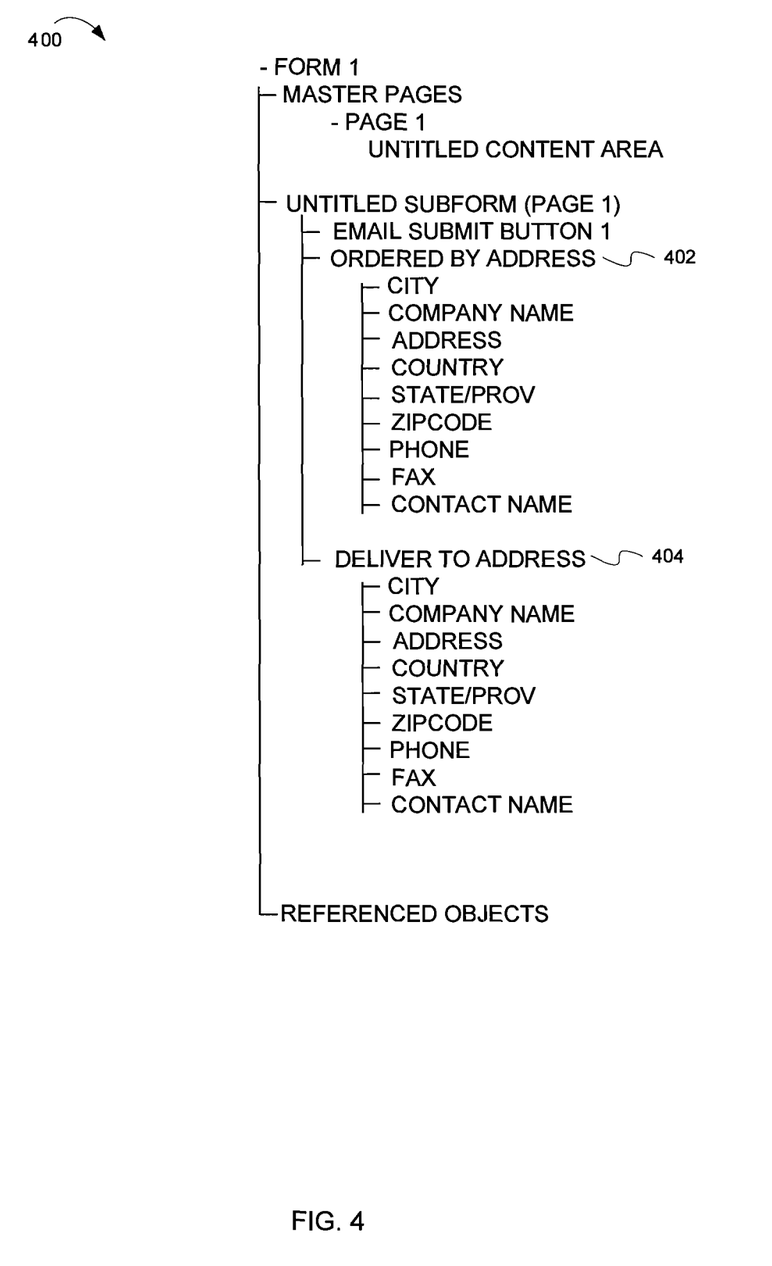
FIG. 4 illustrates a hierarchy for the purchase order template of FIG. 3, according to example embodiments.

FIG. 4 illustrates a hierarchy for the purchase order template of FIG. 3, according to example embodiments. Of particular note, the hierarchy 400 includes two separate entries for the two address blocks 302 and 304 of FIG. 3. The hierarchy 400 includes an ordered by address 402 and deliver to address 404 that corresponds to the first address block 302 and the second address block 304 of FIG. 3, respectively.

The command may be to perform any of a number of different updates. For example, the command may be to replace a current form fragment template with a different one. Thus, the programmer may provide a new form fragment template that is to be referenced instead of one or more form fragment templates in the form templates 108. The new form fragment template may be the alternative form component. The programmer may locate a current form component from within the form templates 108 that is to be the alternative form component. The programmer may also edit the alternative form component. In some embodiments, the programmer may create a new form component that is to be the alternative form component. The alternative form component may be given a new title. For example, if the form component is a form fragment template that is an address block, the title may be "Address" instead of titles that are for specific uses (e.g., sender's address, shipping address, etc.). The programmer may then save any edits may to the form fragment template.

The command may be for other types of updates for the form component. For example, the command may be to change the form component from one type to a second type. To illustrate, the command may be to change a subform template to a form fragment template. Such a change would allow one copy of the data (in the form fragment template) that can then be referenced by any number of form templates.

Another example update operation may include a change in the template hierarchy for the form component. For example, the update operation may merge two or more form components. To illustrate, two subform templates may be combined into one subform template. To further illustrate, two or more fields may be placed into a new or existing subform template or form fragment template. With reference to FIG. 2, the phone number field and the fax number field may be combined into a subform template (which becomes a template that is included by purchase order template 300). Another example update operation for a change in the template hierarchy for the form component may be a split operation. For example, a subform template or a form fragment template may be split into two separate subform templates or form fragment templates, respectively. With reference to FIG. 2, assume that the different fields of the address blocks are considered to be part of one subform template. The subform template for the address block may be split into one subform template for the street address, city and state and a second subform template for the country and zip code.

Another example update operation for a change in the template hierarchy for the form component may be movement up or down the hierarchy. Another example update operation may be the deletion of a form component. For example, a field or subform template may be deleted from all of the form templates. In some embodiments, the update operation may be a combination of a merge or split operation in conjunction with movement up or down the hierarchy or deletion of a form component. Another update operation may be a change in the name of the form component. Returning to the flow diagram 200, the flow continues at block 204.

At block 204, the refactor template module 102 performs a pattern matching across a number of form templates to identify a set of form templates that include the form template. With reference to FIG. 1, the refactor template module 102 may traverse the form templates 108 in the machine-readable medium 106 to identify this set of form templates. The refactor template module 102 may base the pattern matching on a number of different criteria. For example, the refactor template module 102 may pattern match based on a search for the name of the form component. In some embodiments, the name match may be exact or partial. For example, a subform template for an address book may have a number of variations (such as "address book", "address book #1", "address book for form template #N", etc.). Thus, if the search criteria is for a name that at least includes the phrase "address book", a partial pattern match would locate of all of these variations. In some embodiments, the refactor template module 102 may pattern match by searching for certain data in the form component. For example, the refactor template module 102 may search for one or more fields for a subform template or form fragment template. To illustrate, for an address block, the search may be for fields such as city, state, zip code, etc. The flow continues at block 206.

At block 206, the refactor template module 102 validates the identified set of form templates. In some embodiments, the refactor template module 102 validates by presenting the set of form templates to the user (e.g., a programmer) who initially input the command to perform the update. For example, the refactor template module 102 may provide a visual display of the result using thumbnails to enable the user to possibly narrow the list of candidates to be within the set of form templates to be updated. Alternatively or in addition, the refactor template module 102 may present a list of the titles of the candidates, a list of the title and the first two number of fields in the form component, etc. The user may review the set of templates to validate that these templates are the ones to be updated. In some embodiments, the operations of the flow diagram 200 are independent of the validation by the user. The flow continues at block 208.

At block 208, the refactor template module 102 refactors the set of validated form templates that includes updates to the form component across the set of validated form templates. In some embodiments, the update operation may include the changing the reference to a new alternative form component in the set of form templates. The refactor template module 102 may change a current reference in the set of form templates to reference the address of an alternative form component (as described above).

Figure 5:
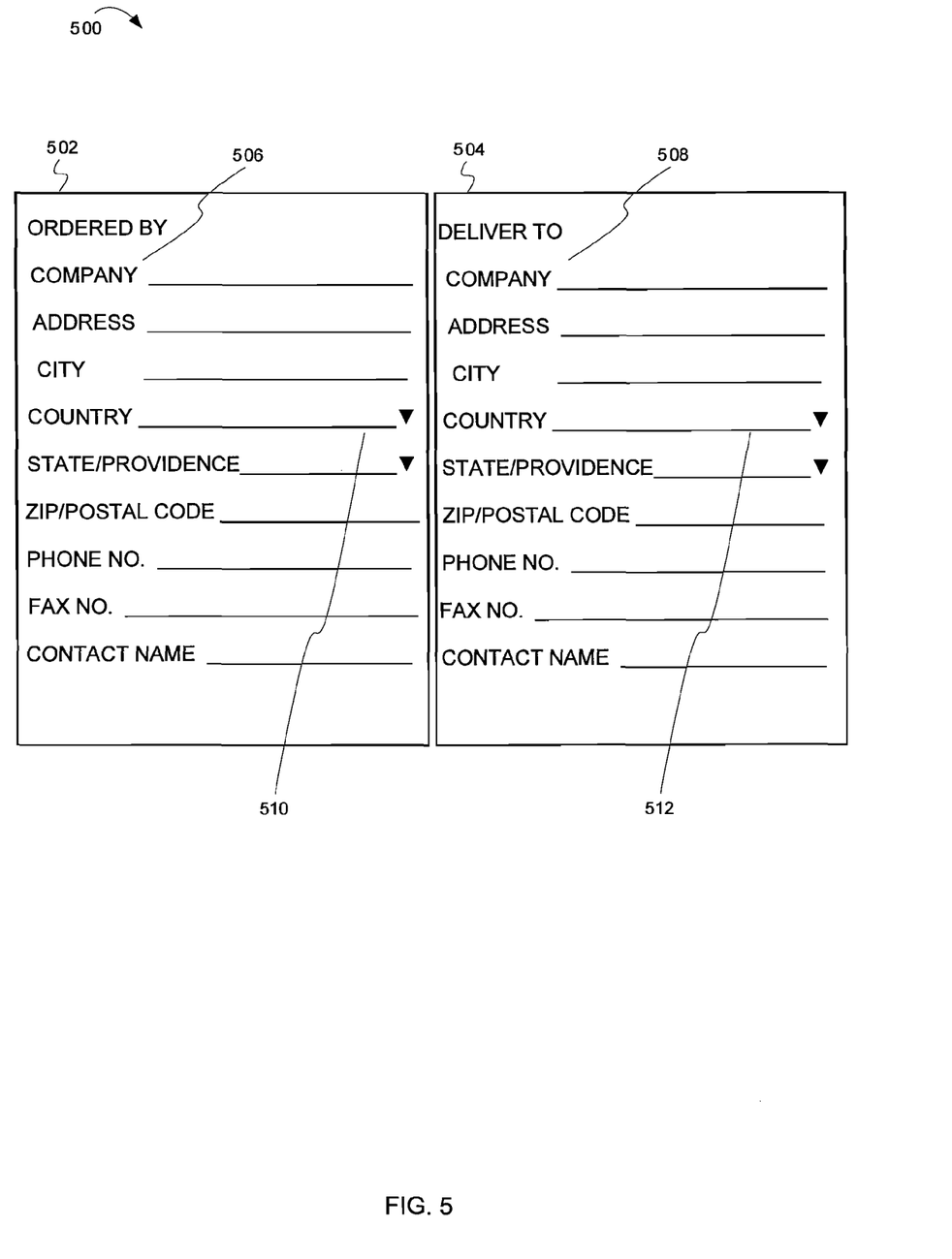
FIG. 5 illustrates form components for a purchase order template after a refactor update, according to example embodiments.

For example, FIG. 5 illustrates form components for a purchase order template after a refactor update, according to example embodiments. FIG. 5 illustrates form components 500 that are two form fragment templates that are part of a form template for a purchase order. The two form fragment templates include two different address blocks from FIG. 3 after the refactor update. The first address block 502 and the second address block 504 correspond to the first address block 302 and the second address block 304 of FIG. 3, respectively. As shown, the two differences (described above) have been resolved. In particular, the company field 506 and the company field 508 both have a caption of "Company." Also, the country field 510 and the country field 512 are both pulldown menus. Further, the template hierarchy has changed.

Figure 6:
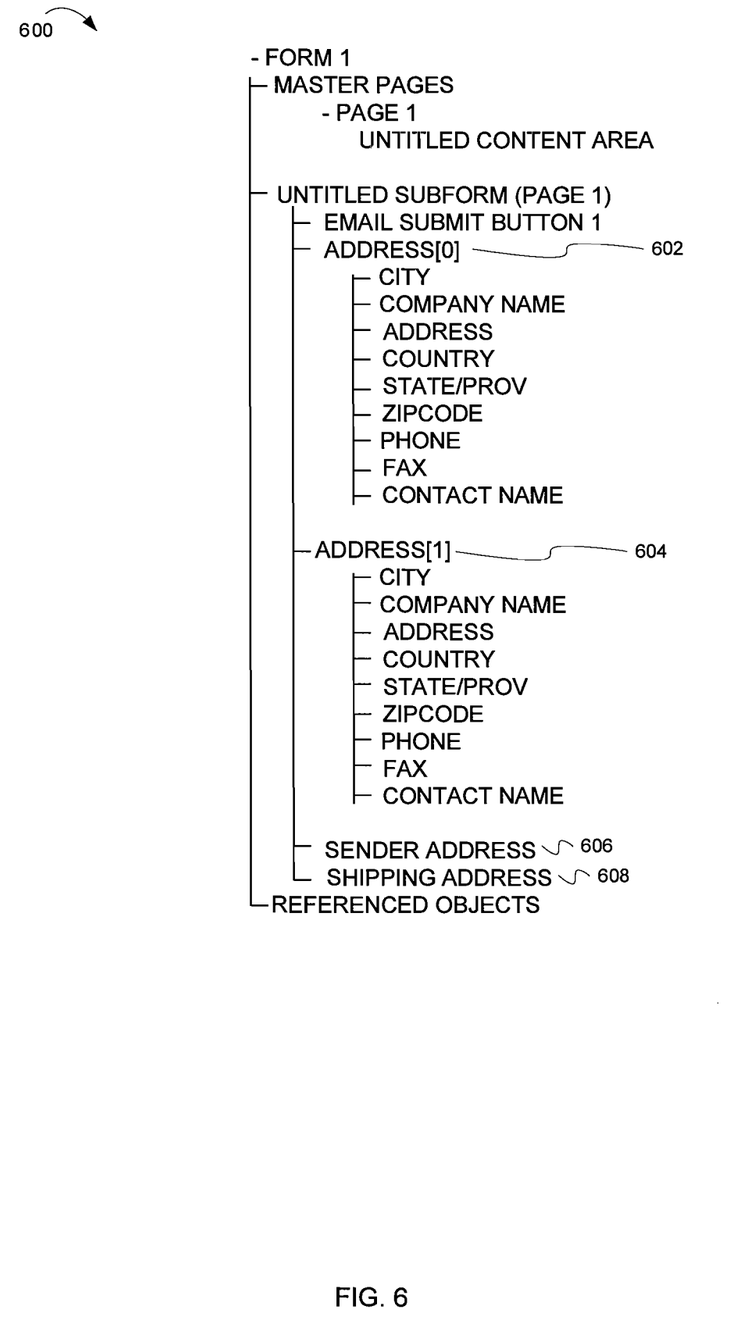
FIG. 6 illustrates a hierarchy for the purchase order template of FIG. 5, according to example embodiments.

To illustrate, FIG. 6 illustrates a hierarchy for the purchase order template of FIG. 5, according to example embodiments. Of particular note, the hierarchy 600 includes two different instances of a same address block for the two address blocks 502 and 504 of FIG. 5. The hierarchy 600 includes an address[0] 602 and an address[1] 604 that corresponds to the first address block 502 and the second address block 504 of FIG. 3, respectively. The text field for the titles (which are specific to each address block) has been moved from the two form fragment templates and into the purchase order template. A first text field 606 is for the title for the address block for the address of the sender. A second text field 608 is for the title for the address block for the address where the order is being shipped. Accordingly, the address blocks are the same, as specific form components (the text fields for the titles) are removed there from.

In some embodiments, the update operation may be to replace the form component across the set of form templates. Accordingly, the refactor template module 102 replaces the current form component with the alternative form component in the set of form templates. As described above, the update operations may be any of a number of different types (such as change of type, change in template hierarchy, change in name, etc.). Thus, the refactor template module 102 may update the form components in the set of form templates based on the identified update operation. In some embodiments, after completion of the updates, the refactor template module 102 may log the updates, notify the issuer of the update command, etc. The operations of the flow diagram 200 are complete.

Figure 7:
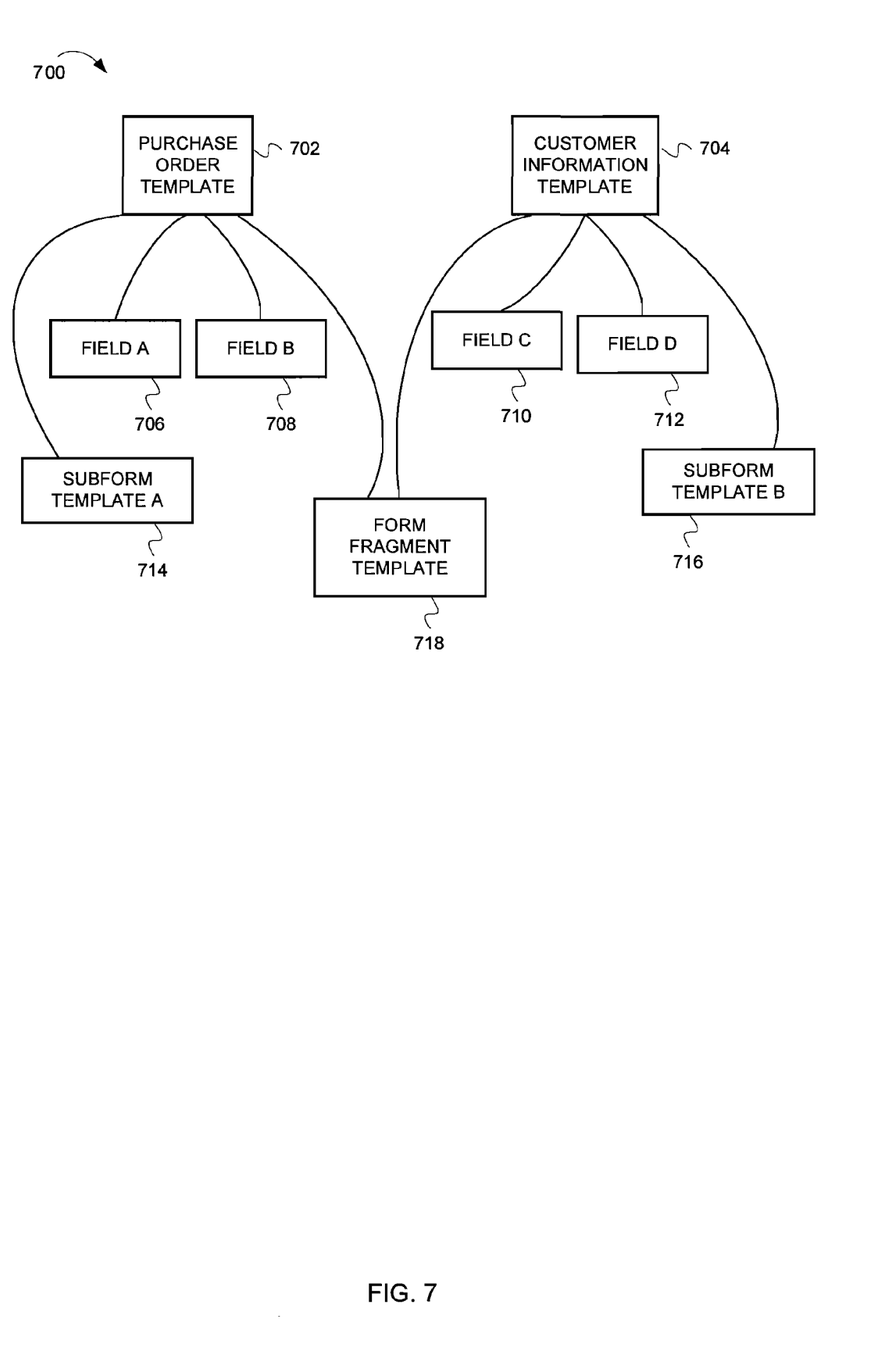
FIG. 7 is a diagram of a dependency graph used in refactoring of form templates, according to example embodiments.

Some embodiments may use a dependency graph to refactor the form templates. FIG. 7 is a diagram of a dependency graph used in refactoring of form templates, according to example embodiments. FIG. 7 illustrates a dependency graph 700 that includes two form templates—a purchase order template 702 and a customer information template 704. The purchase order template 702 has dependencies that include four different form components. The dependencies include a field A 706, a field B 708, a subform template 714 and a form fragment template 718. The customer information template 704 also has dependencies that include four different form components. The dependencies include a field C 710, a field D 712, a subform template B 716 and the form fragment template 718. Thus, the form template 702 and the form template 704 share a same dependency—the form fragment template 718. For example, the form fragment template 718 may be an address block that has application for a purchase order and for customer information. Thus, a dependency graph may enable to track the dependencies among the different form components.

Figure 8:
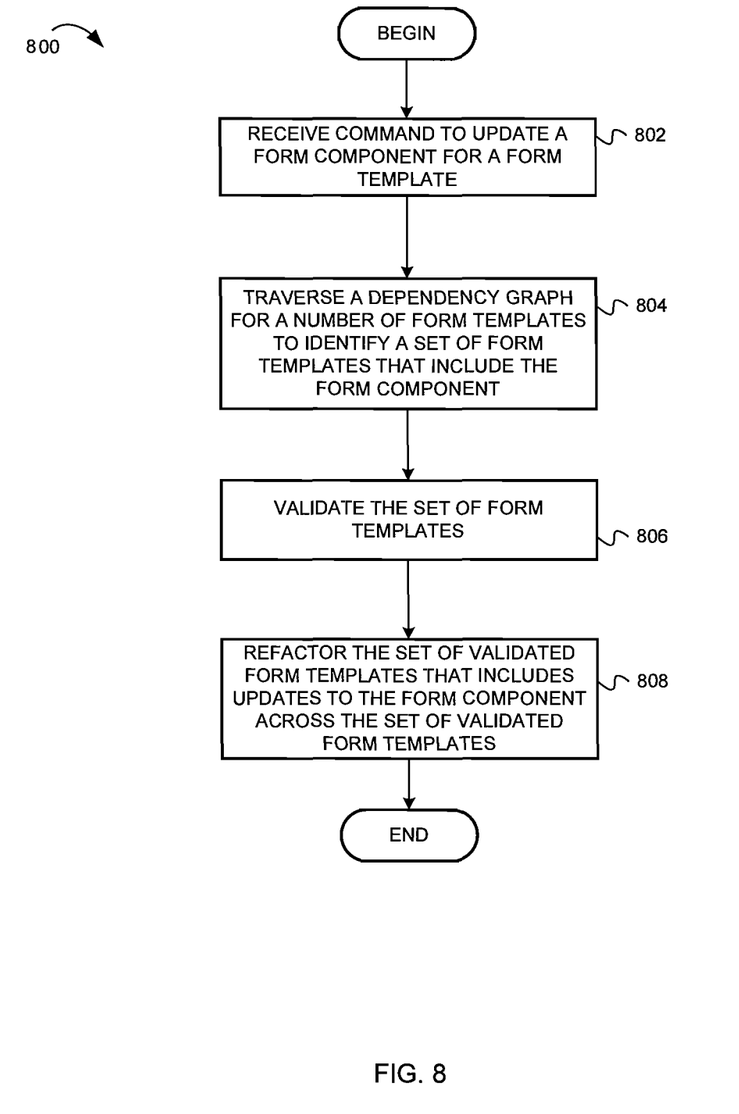
FIG. 8 is a diagram of a method for refactoring of form templates using a dependency graph, according to example embodiments.

FIG. 8 is a diagram of a method for refactoring of form templates using a dependency graph, according to example embodiments. The flow diagram 800 is described with reference to FIGS. 1 and 7. In some embodiments, the flow diagram 800 is performed by the refactor template module 102. The flow diagram 800 commences at block 802.

At block 802, the refactor template module 102 receives a command to update a form component for a form template. As described above, the refactor template module 102 may receive the command (via a user interface device) from a programmer who is updating a form component for a form template. The form component being updated may be a subform template, a form fragment template, a code fragment template, a field, etc. The command may be to perform any of a number of different updates. As described above, the updates may be to replace a current form fragment template or subform template with a different one, a change the form component from one type to a second type; a change in the template hierarchy for the form component; a change in the name of the form component. The flow continues at block 804.

At block 804, the refactor template module 102 traverses a dependency graph for a number of form templates to identify a set of form templates that include the form component. The refactor template module 102 may locate the form component in the dependency graph. The refactor template module 102 may then traverse the graph to determine the dependencies. With reference to FIG. 6, assume that the form component is the form fragment template 618, the refactor template module 102 may determine that the purchase order template 602 and the customer information template 604 include the form fragment template 618 by tracking the relationships identified in the dependency graph 600. The flow continues at block 806.

At block 806, the refactor template module 102 validates the identified set of form templates. As described above, in some embodiments, the refactor template module 102 validates by presenting the set of form templates to the user (e.g., a programmer) who initially input the command to perform the update. The user may review the set of templates to validate that these templates are the ones to be updated. The flow continues at block 808.

At block 808, the refactor template module 102 refactors the set of validated form templates that includes updates to the form component across the set of validated form templates. In some embodiments, the update operation may include the changing the reference to a new alternative form component in the set of form templates. The refactor template module 102 may change a current reference in the set of form templates to reference the address of an alternative form component (as described above). As described above, the update operations may be any of a number of different types (such as change of type, change in template hierarchy, change in name, etc.). In some embodiments, after completion of the updates, the refactor template module 102 may log the updates, notify the issuer of the update command, etc. The operations of the flow diagram 800 are complete.

While the flow diagrams of FIGS. 2 and 8 illustrate updates to one form component, in some embodiments, any number of form components may be updated based on one or more commands. For example, one command may require changes in the template hierarchy, a change in name, a merge of two subform templates, etc.

Figure 9:
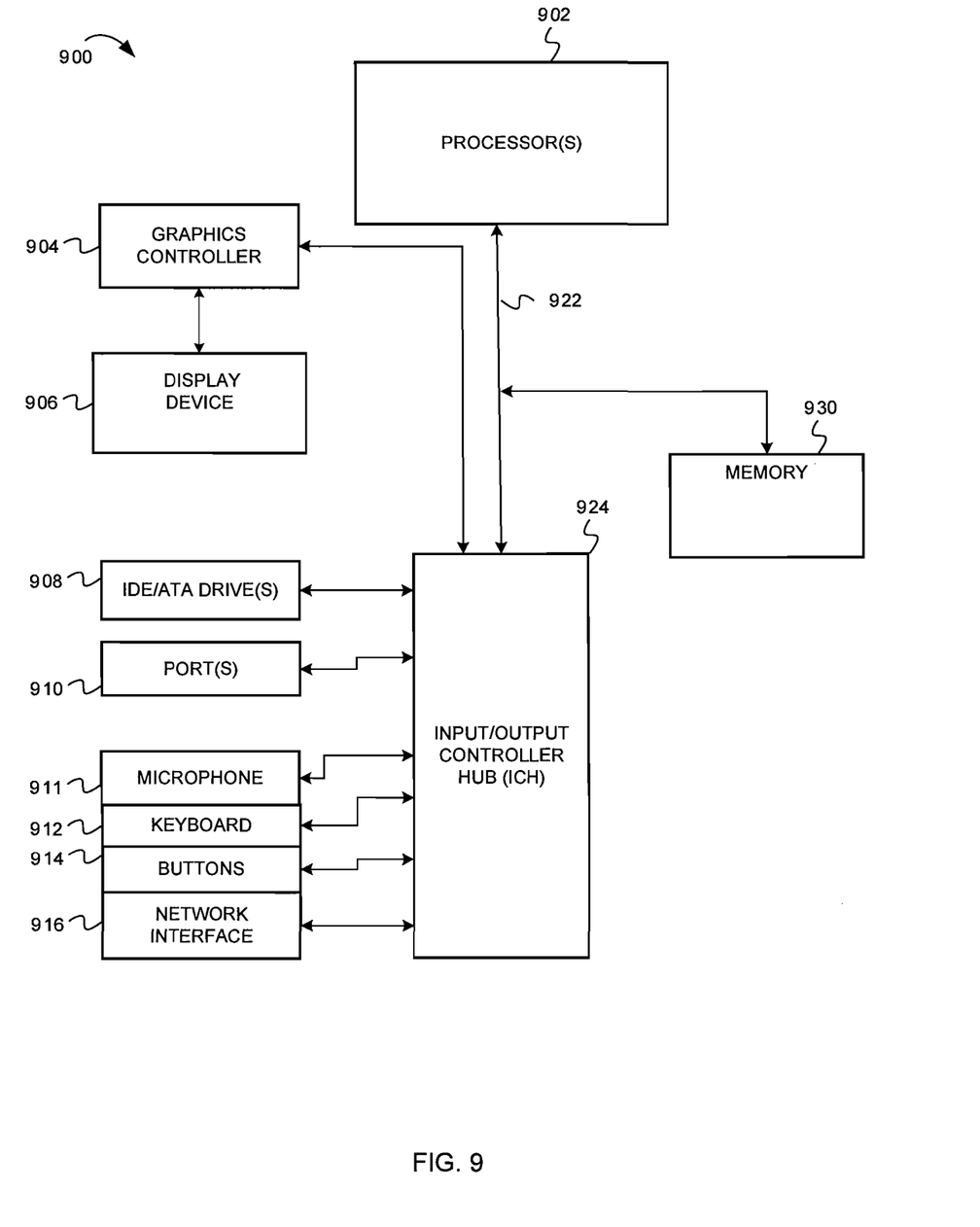
FIG. 9 illustrates a computer that may be used for refactoring of form templates, according to example embodiments.

A detailed block diagram of an example computer environment, according to some embodiments, is now described. In particular, FIG. 9 illustrates a computer that may be used for refactoring of form templates, according to example embodiments. A computer system 900 may be representative of the system 100 of FIG. 1.

As illustrated in FIG. 9, the computer system 900 comprises processor(s) 902. The computer system 900 also includes a memory unit 930, processor bus 922, and Input/Output controller hub (ICH) 924. The processor(s) 902, memory unit 930, and ICH 924 are coupled to the processor bus 922. The processor(s) 902 may comprise any suitable processor architecture. The computer system 900 may comprise one, two, three, or more processors, any of which may execute a set of instructions in accordance with embodiments of the invention.

The memory unit 930 may store data and/or instructions, and may comprise any suitable memory, such as a dynamic random access memory (DRAM). The computer system 900 also includes IDE drive(s) 908 and/or other suitable storage devices. A graphics controller 904 controls the display of information on a display device 906, according to some embodiments of the invention.

The input/output controller hub (ICH) 924 provides an interface to I/O devices or peripheral components for the computer system 900. The ICH 924 may comprise any suitable interface controller to provide for any suitable communication link to the processor(s) 902, memory unit 930 and/or to any suitable device or component in communication with the ICH 924. For one embodiment of the invention, the ICH 924 provides suitable arbitration and buffering for each interface.

For some embodiments of the invention, the ICH 924 provides an interface to one or more suitable integrated drive electronics (IDE) drives 908, such as a hard disk drive (HDD) or compact disc read only memory (CD ROM) drive, or to suitable universal serial bus (USB) devices through one or more USB ports 910. For one embodiment, the ICH 924 also provides an interface to a keyboard 912, a mouse 914, a CD-ROM drive 918, one or more suitable devices through one or more firewire ports 916. For one embodiment of the invention, the ICH 924 also provides a network interface 920 though which the computer system 900 can communicate with other computers and/or devices.

In some embodiments, the computer system 900 includes a machine-readable medium that stores a set of instructions (e.g., software) embodying any one, or all, of the methodologies for described herein. Furthermore, software may reside, completely or at least partially, within memory unit 930 and/or within the processor(s) 902.

In the description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that embodiments of the invention may be practiced without such specific details. In other instances, control structures, gate level circuits and full software instruction sequences have not been shown in detail in order not to obscure the embodiments of the invention. Those of ordinary skill in the art, with the included descriptions will be able to implement appropriate functionality without undue experimentation.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Embodiments of the invention include features, methods or processes that may be embodied within machine-executable instructions provided by a machine-readable medium. A machine-readable medium includes any mechanism which provides (i.e., stores and/or transmits) information in a form accessible by a machine (e.g., a computer, a network device, a personal digital assistant, manufacturing tool, any device with a set of one or more processors, etc.). In an exemplary embodiment, a machine-readable medium includes volatile and/or nonvolatile media (e.g., read only memory (ROM), random access memory (RAM), magnetic disk storage media, optical storage media, flash memory devices, etc.), as well as electrical, optical, acoustical or other form of propagated signals (e.g., carrier waves, infrared signals, digital signals, etc.).

Such instructions are utilized to cause a general or special purpose processor, programmed with the instructions, to perform methods or processes of the embodiments of the invention. Alternatively, the features or operations of embodiments of the invention are performed by specific hardware components which contain hard-wired logic for performing the operations, or by any combination of programmed data processing components and specific hardware components. Embodiments of the invention include software, data processing hardware, data processing system-implemented methods, and various processing operations, further described herein.

In view of the wide variety of permutations to the embodiments described herein, this detailed description is intended to be illustrative only, and should not be taken as limiting the scope of the invention. What is claimed as the invention, therefore, is all such modifications as may come within the scope and spirit of the following claims and equivalents thereto. Therefore, the specification and drawings are to be regarded in an illustrative rather than a restrictive sense.

What is claimed is:

1. A method comprising:
   receiving an alternative form component for a starting form component included in each of a set of form templates of a plurality of form templates;
   based on receiving a command to update the starting form component, performing a pattern matching across the plurality of form templates to identify the set of form templates in the plurality of form templates; and
   using one or more processors, refactoring each form template of the set of form templates as identified by the pattern matching, the refactoring including changing each form template of the set to reference the alternative form component instead of the starting form component.

2. The method of claim 1, further comprising validating the set of form templates prior to refactoring.

3. The method of claim 2, wherein the validating comprises receiving validation from user input.

4. The method of claim 1, wherein at least one of the starting and alternative form components is at least one of a subform template, a form fragment template, a code fragment template, or a field.

5. The method of claim 1, wherein the performing of the pattern matching comprises pattern matching based on at least one of at least a partial match of a name of the starting form component and at least a partial match of a type of data field in the starting form component.

6. A non-transitory machine-readable medium including instructions which when executed by a machine causes the machine to perform operations comprising:
   receiving a command to update a starting form component with an alternative form template, the starting form template included in each of a set of form templates of a plurality of form templates, the starting form component including at least one of a subform template, a form fragment template, or a field;

based on receiving the command, performing a pattern matching across the plurality of form templates to identify the set of form templates having the starting form component; and refactoring the set of form templates, the refactoring including performing an update operation across the set of form templates, the update operation being at least one of converting a subform template to a form fragment template, updating a location in a template hierarchy for the starting form component, or updating a change of a name for the starting form component.

7. The non-transitory machine-readable medium of claim 6, wherein the updating of the location in the template hierarchy for the starting form component comprises separating a subform template or a code fragment template into two or more sub form templates or two or more code fragment templates, respectively.

8. The non-transitory machine-readable medium of claim 6, wherein the updating of the location in the template hierarchy for the starting form component comprises merging two or more subform templates or two or more code fragment templates.

9. The non-transitory machine-readable medium of claim 6, wherein the starting form component is at least one of a subform template, a form fragment template, a code fragment template, or a field.

10. The non-transitory machine-readable medium of claim 6, wherein the performing of the pattern matching comprises pattern matching based on at least one of at least a partial match of a name of the starting form component and at least a partial match of a type of data field in the starting form component.

11. The non-transitory machine-readable medium of claim 6, further comprising validating the set of form templates prior to refactoring.

12. An apparatus comprising:
a non-transitory machine-readable medium to store a plurality of form templates; and
a refactor template module, implemented by a processor, coupled to the non-transitory machine-readable medium, configured to:
pattern match across the plurality of form templates to identify a set of form templates in the plurality of form templates that include a form fragment template or a subform template, the form fragment template or the subform template being a starting form component of each form template of the set of form templates, each form template of the set referencing the starting form component; and
to refactor each form template of the set of form templates to change each form template of the set to reference an alternative form fragment template or to replace the subform template with an alternative subform template;
wherein the patter match occurs based upon receiving a command to update the form fragment template or the subform template.

13. The apparatus of claim 12, wherein the refactor template module is to validate the set of form templates prior to the refactor of the set of form templates.

14. The apparatus of claim 13, wherein the refactor template module is to validate using validation from user input.

15. The apparatus of claim 12, wherein the refactor template module is to pattern match based on a pattern match operation that comprises at least one of at least a partial match of a name of the form fragment template or the subform template and at least a partial match of a type of data field in the form fragment template or the subform template.

16. An apparatus comprising:
a non-transitory machine-readable medium to store a plurality of form templates; and
a refactor template module, implemented by a processor, coupled to the non-transitory machine-readable medium, configured to:
locate a set of form templates within the plurality of form templates having a starting form component to be updated, the starting form component being a component of each form template of the set of form templates, each form template of the set referencing the form component; and
refactor each form template of the set of form templates by performing an update operation across the set of form templates, wherein the update operation includes at least one of an operation to replace the starting form component with an alternative form component, an operation to convert a subform template to a form fragment template, or an operation to update a location in a template hierarchy for the form component;
wherein locating the set of form components occurs based upon receiving a command to update the starting form component.

17. The apparatus of claim 16, wherein the operation to update the location in the template hierarchy for the starting form component comprises an operation to separate a subform template or a code fragment template into two or more sub form templates or two or more code fragment templates, respectively.

18. The apparatus of claim 16, wherein the operation to update the location in the template hierarchy for the starting form component comprises an operation to merge two or more subform templates or two or more code fragment templates.

19. The apparatus of claim 16, wherein the starting form component is at least one of a subform template, a form fragment template, a code fragment template, or a field.

20. The apparatus of claim 16, wherein the refactor template module is to locate the set of form templates based on a pattern match operation that comprises at least one of at least a partial match of a name of the starting form component and at least a partial match of a type of data field in the starting form component.

21. The apparatus of claim 16, wherein the refactor template module is to locate the set of form templates based on a dependency graph.

* * * * *